(12) United States Patent
Wu

(10) Patent No.: US 10,111,142 B2
(45) Date of Patent: Oct. 23, 2018

(54) DEVICE AND METHOD OF HANDLING A USER EQUIPMENT ACCESS STRATUM CONTEXT

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/604,637

(22) Filed: May 24, 2017

(65) Prior Publication Data

US 2017/0347296 A1    Nov. 30, 2017

Related U.S. Application Data

(60) Provisional application No. 62/343,803, filed on May 31, 2016.

(51) Int. Cl.
| | |
|---|---|
| *H04W 36/00* | (2009.01) |
| *H04W 76/19* | (2018.01) |
| *H04W 76/18* | (2018.01) |
| *H04W 76/10* | (2018.01) |
| *H04W 36/14* | (2009.01) |
| *H04W 84/04* | (2009.01) |

(52) U.S. Cl.
CPC ... *H04W 36/0033* (2013.01); *H04W 36/0022* (2013.01); *H04W 76/10* (2018.02); *H04W 76/18* (2018.02); *H04W 76/19* (2018.02); *H04W 36/14* (2013.01); *H04W 84/042* (2013.01)

(58) Field of Classification Search
CPC . H04W 36/0033; H04W 76/19; H04W 76/18; H04W 76/10; H04W 36/0022; H04W 36/14; H04W 84/042
See application file for complete search history.

(56) References Cited

U.S. PATENT DOCUMENTS

| | | | |
|---|---|---|---|
| 2010/0212638 A1* | 8/2010 | Rado | F01B 7/14 123/51 R |
| 2013/0039827 A1* | 2/2013 | Sun | B01D 53/8631 423/235 |

(Continued)

OTHER PUBLICATIONS

Search Report dated Nov. 17, 2017 for EP application No. 17173413.0, pp. 1-9.

(Continued)

*Primary Examiner* — Duc C Ho

(74) *Attorney, Agent, or Firm* — Winston Hsu

(57) ABSTRACT

A communication device for handling a user equipment (UE) Access Stratum (AS) context comprises a storage device for storing instructions and a processing circuit coupled to the storage device. The processing circuit is configured to execute the instructions stored in the storage device. The instructions comprise receiving a first radio resource control (RRC) message via a RRC connection from a first radio access network (RAN) of a first radio access technology (RAT), wherein the RRC message comprises a resume identity and indicates a RRC suspension; suspending the RRC connection in response to the first RRC message; keeping a UE AS context, when the RRC connection is suspended; selecting a cell of a second RAN of a second RAT different from the first RAT; and determining that the UE AS context and the resume identity are invalid in response to the selection.

16 Claims, 3 Drawing Sheets

(56) References Cited

U.S. PATENT DOCUMENTS

2016/0234877 A1* 8/2016 Bangolae ............... H04W 4/70
2017/0311290 A1* 10/2017 Adjakple .............. H04W 76/18
2018/0035420 A1* 2/2018 Centonza ............ H04W 72/048

OTHER PUBLICATIONS

Nokia, "Security for RRC suspend and RRC resume", 3GPP TSG-SA3 Meeting #83, S3-160532, May 9-13, 2016, Los Cabos, Mexico, XP051099238, pp. 1-6.

Huawei, HiSilicon, "Evaluation on RAN initiated paging and MME initiated paging", 3GPP TSG-RAN WG2 Meeting #94, R2-163930, May 23-27, 2016, Nanjing, China, XP051105296, pp. 1-12.

Nokia Networks, "Signaling details for UP based solution", 3GPP TSG-RAN WG3 Meeting NB-IOT, R3-160057, Jan. 20-22, 2016, Budapest, Hungary, XP051067016, pp. 1-5.

3GPP TS 23.401 V13.6.1 (Mar. 2016) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 13).

3GPP TS 24.301 V13.5.0 (Mar. 2016) Technical Specification 3rd Generation Partnership Project; Technical Specification Group Core Network and Terminals; Non-Access-Stratum (NAS) protocol for Evolved Packet System (EPS); Stage 3 (Release 13).

3GPP TSG-RAN WG2 Meeting #94 R2-164415 Nanjing, P.R. China, May 23-27, 2016 CR-Form-v11.1 Change Request 36.300 CR 0880 rev 3 Current version: 13.3.0.

3GPP TSG-RAN WG2 Meeting #94 R2-164427 Nanjing, China, May 23-27, 2016 CR-Form-v11.1 Change Request 36.331 CR 2210 rev 1 Current version: 13.1.0.

3GPP TSG-RAN WG2 Meeting#94 R2-164516 Nanjing, P.R China, May 23-27, 2016 CR-Form-v11.1 Change Request 36.331 CR 2231 rev 4 Current version: 13.1.0.

* cited by examiner

DEVICE AND METHOD OF HANDLING A USER EQUIPMENT ACCESS STRATUM CONTEXT

CROSS REFERENCE TO RELATED APPLICATIONS

This application claims the benefit of U.S. Provisional Application No. 62/343,803 filed on May 31, 2016, which is incorporated herein by reference.

BACKGROUND OF THE INVENTION

1. Field of the Invention

The present invention relates to a device and a method used in a wireless communication system, and more particularly, to a device and a method of handling a user equipment Access Stratum context.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

SUMMARY OF THE INVENTION

The present invention therefore provides a communication device and method for handling a user equipment Access Stratum context to solve the abovementioned problem.

A communication device for handling a user equipment (UE) Access Stratum (AS) context comprises a storage device for storing instructions and a processing circuit coupled to the storage device. The processing circuit is configured to execute the instructions stored in the storage device. The instructions comprise being configured a radio resource control (RRC) connection and a data radio bearer (DRB) by a first radio access network (RAN) of a first radio access technology (RAT); receiving a first RRC message via the RRC connection from the first RAN, wherein the first RRC message comprises a resume identity and indicates a RRC suspension; suspending the RRC connection in response to the first RRC message; keeping a UE AS context, when the RRC connection is suspended; selecting a cell of a second RAN of a second RAT different from the first RAT; determining that the UE AS context and the resume identity are invalid in response to the selection; and transmitting a RRC connection request message to the first RAN, when the UE selects back a cell of the first RAN from the second RAN in response to the determination.

A method for handling a user equipment (UE) Access Stratum (AS) context of a communication device comprises being configured a radio resource control (RRC) connection and a data radio bearer (DRB) by a first radio access network (RAN) of a first radio access technology (RAT); receiving a first RRC message via the RRC connection from the first RAN, wherein the first RRC message comprises a resume identity and indicates a RRC suspension; suspending the RRC connection in response to the first RRC message; keeping a UE AS context, when the RRC connection is suspended; selecting a cell of a second RAN of a second RAT different from the first RAT; determining that the UE AS context and the resume identity are invalid in response to the selection; and transmitting a RRC connection request message to the first RAN, when the UE selects back a cell of the first RAN from the second RAN in response to the determination.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
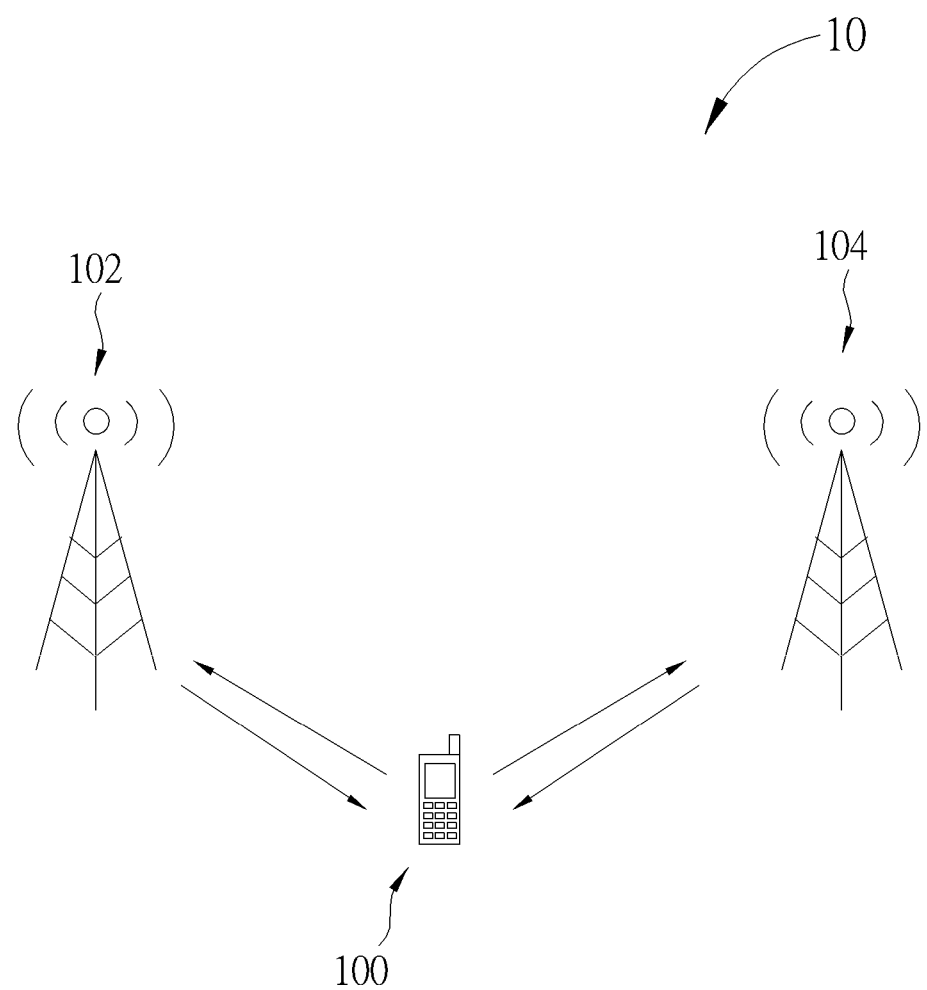
FIG. 1 is a schematic diagram of a wireless communication system according to an example of the present invention.

FIG. 1 is a schematic diagram of a wireless communication system 10 according to an example of the present invention. The wireless communication system 10 is composed of a communication device 100, radio access networks (RANs) 102 and 104. In FIG. 1, the communication device 100, the RANs 102 and 104 and are utilized for illustrating the structure of the wireless communication system 10. Practically, each of the RANs 102 and 104 may include an evolved NB (eNB) or a fifth generation (5G) (or called new radio (NR)) base station (BS). The 5G (or NR) BS supports orthogonal frequency-division multiplexing (OFDM) and/or non-OFDM, a transmission time interval (TTI) shorter than 1 ms (e.g., 100 or 200 microseconds) and a wider system bandwidth (e.g., 200 MHz). In FIG. 1, coverage areas of the RANs 102 and 104 may be overlapped or non-overlapped. In general, a BS may also be used to refer any of the eNB and the 5G BS.

The communication device 100 may be a user equipment (UE), a mobile phone, a laptop, a tablet computer, an electronic book, a portable computer system, a vehicle, or an airplane. For uplink (UL), the communication device 100 is the transmitter and the RAN 102 and/or the RAN 104 is the receiver, and for downlink (DL), the RAN 102 and/or the RAN 104 is the transmitter and the communication device 100 is the receiver.

Figure 2:
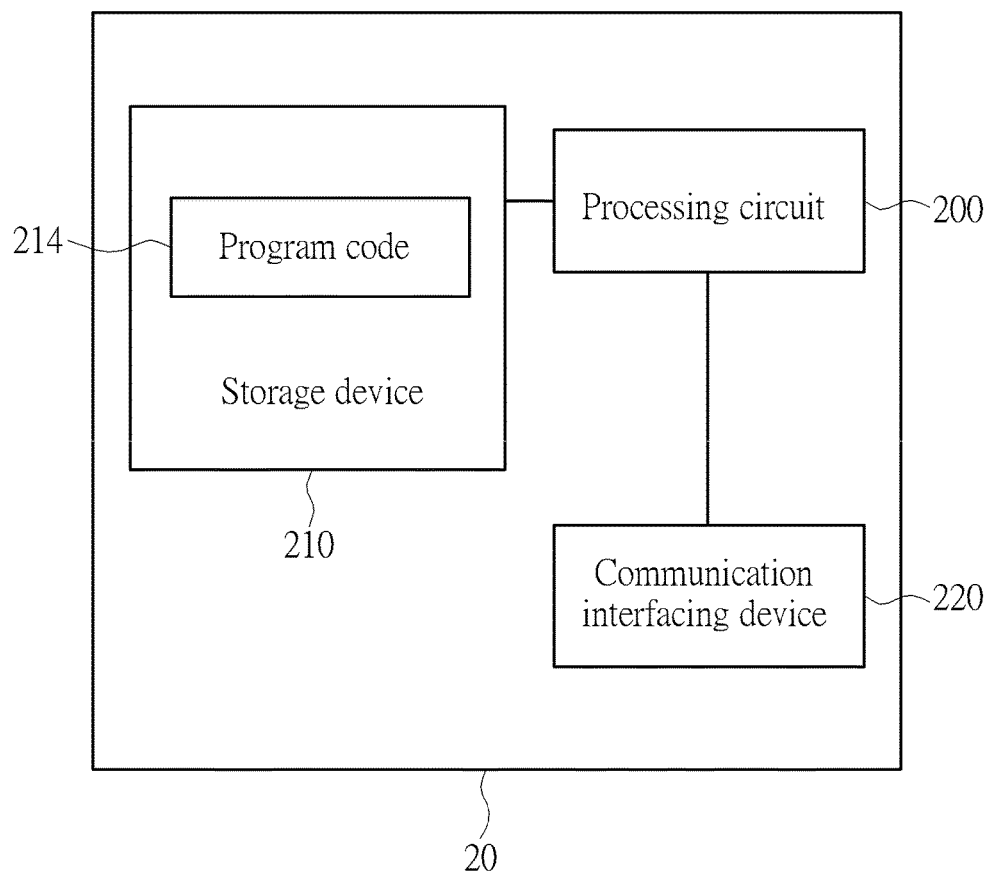
FIG. 2 is a schematic diagram of a communication device according to an example of the present invention.

FIG. 2 is a schematic diagram of a communication device 20 according to an example of the present invention. The communication device 20 may be the communication device 100, the RAN 102 and/or the RAN 104 shown in FIG. 1, but is not limited herein. The communication device 20 includes a processing circuit 200 such as a microprocessor or Application Specific Integrated Circuit, a storage device 210 and a communication interfacing device 220. The storage device 210 may be any data storage device that stores a program code 214, accessed and executed by the processing circuit 200. Examples of the storage device 210 include but are not limited to read-only memory, flash memory, random-access memory, hard disk, optical data storage device, non-volatile storage device, non-transitory computer-readable medium (e.g., tangible media), etc. The communication interfacing device 220 includes a transceiver used to transmit and receive signals (e.g., data, signals, messages and/or packets) according to processing results of the processing circuit 200.

In the following embodiments, a UE is used to represent the communication device 100 in FIG. 1, to simplify the illustration of the embodiments.

Figure 3:
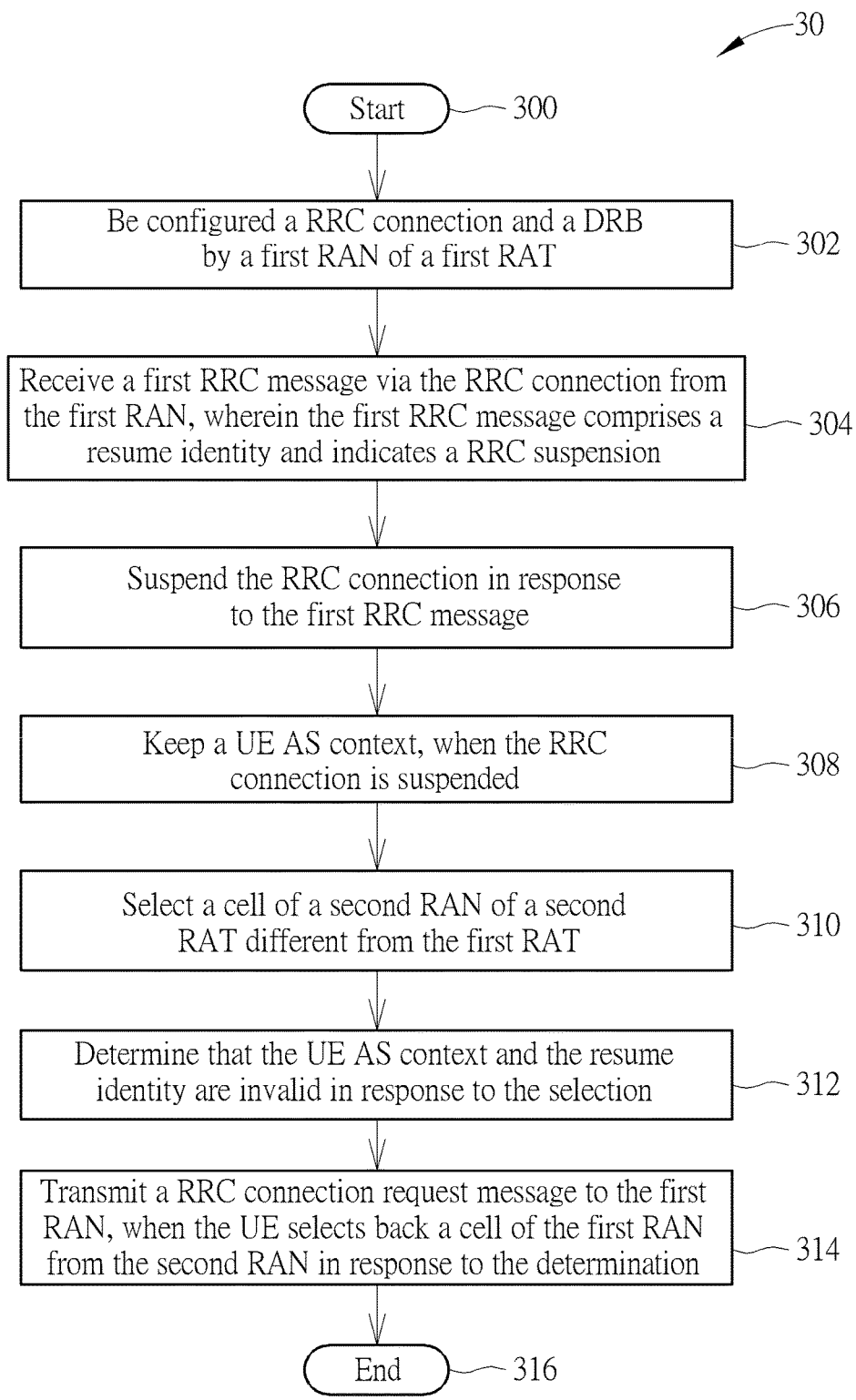
FIG. 3 is a flowchart of a process according to an example of the present invention.

FIG. 3 is a flowchart of a process 30 according to an example of the present invention. The process 30 may be utilized in a UE (e.g., the communication device 100). The process 30 includes the following steps:

Step 300: Start.

Step 302: Be configured a radio resource control (RRC) connection and a data radio bearer (DRB) by a first RAN of a first radio access technology (RAT).

Step 304: Receive a first RRC message via the RRC connection from the first RAN, wherein the first RRC message comprises a resume identity and indicates a RRC suspension.

Step 306: Suspend the RRC connection in response to the first RRC message.

Step 308: Keep a UE AS context, when the RRC connection is suspended.

Step 310: Select a cell of a second RAN of a second RAT different from the first RAT.

Step 312: Determine that the UE AS context and the resume identity are invalid in response to the selection.

Step 314: Transmit a RRC connection request message to the first RAN, when the UE selects back a cell of the first RAN from the second RAN in response to the determination.

Step 316: End.

According to the process 30, the UE is configured a RRC connection (e.g., including a signaling radio bearer (SRB)) and a DRB by a first RAN of a first RAT (e.g., the RAN 102). The UE receives a first RRC message (e.g., RRCConnectionRelease) via the RRC connection from the first RAN, wherein the first RRC message comprises a resume identity and indicates a RRC suspension. Accordingly, the UE suspends the RRC connection in response to the first RRC message. The UE keeps (or maintains) a UE AS context, when the RRC connection is suspended. Later, the UE may select (or connect) a cell of a second RAN of a second RAT (e.g., the RAN 104) different from the first RAT. The UE determines that the UE AS context and the resume identity are invalid in response to the selection. For example, the UE discards, releases, removes, deletes or clears the UE AS context, or marks the UE AS context invalid. The UE transmits a RRC connection request message (e.g., RRCConnectionRequest) to the first RAN, when the UE selects back a cell of the first RAN from the second RAN in response to the determination. In other words, whether the UE AS context should be kept (i.e., considered as valid) is determined by the UE according to whether the cell of the second RAN is selected. Thus, a rule for handling validity of the UE AS context is provided, and the UE is able to communicate with the first RAN regularly.

When the RRC connection is suspended, the UE may perform a cell selection and/or reselection according to the first RAT. When the RRC connection is suspended (i.e., the UE AS context and the resume identity are valid), the UE may transmit a resume request message to resume the RRC connection.

In one example, the UE enters an idle mode in response to the first RRC message. The UE performs the cell selection and/or reselection in the idle mode according to the first RAT.

The RRC connection request message may not include the resume identity. The RRC connection request message may include a NAS identity (e.g., S-Temporary Mobile Subscriber Identity (S-TMSI)). In one example, the UE receives a RRC connection setup message in response to the RRC connection request message, and enters a connected mode of the first RAT to communicate with the first RAN.

In one example, when the UE AS context and the resume identity are valid, the UE transmits a resume request message (e.g., RRCConnectionResumeRequest) triggered by an initiation of a service request procedure or an extended service request procedure to the first RAN. The initiation of the service request procedure or the extended service request procedure may be due data pending for a transmission, a reception of a paging or a signaling pending for a transmission. The RRCConnectionResumeRequest message may include the resume identity or a truncated version of the resume identity. When the UE receives a connection resume message (e.g., RRCConnectionResume message) in response to the resume request message, the UE resumes the RRC connection according to the kept UE AS context which includes resuming the SRB and the DRB. The resume identity is a unique identification for the first RAN to identify the UE. When the UE AS context and the resume identity are invalid, the UE transmits the RRC connection request message triggered by an initiation of a service request procedure or an extended service request procedure to the first RAN, instead of the resume request message.

Realization of the process 30 is not limited to the above description. The following examples may be applied to the process 30.

In one example, the UE selects the cell of the second RAN according to the second RAT, when the cell of the second RAN meets a cell selection (or reselection) criteria. In one example, after selecting the cell of the second RAN, the UE initiates a connection establishment to connect to the second RAN by transmitting a connection request message (e.g., a RRC connection request message of the second RAT) to the second RAN. Further, the UE receives a connection setup message (e.g., a RRC connection setup message of the second RAT) in response to the connection request message from the second RAN, to enter a connected mode of the second RAT. In one example, the UE considers that the UE AS context is not valid, in response to that the UE selects (or connects) to the second RAN.

In one example, the UE determines that the UE AS context is not valid, when the UE connects to the second RAN. The UE determines the UE AS context is valid, when the UE selects the second RAN but does not connect to the second RAN. That is, the UE does not transmit any request message to the second RAN, or the UE transmits a request message to the second RAN but receives a reject message in response to the request message. Thus, the UE can still resume the RRC connection when selecting back to first RAN. In one example, the UE determines that the UE AS context is not valid, when the UE selects the second RAN and transmits a request message to the second RAN but receives a reject message in response to the request message.

In one example, the UE is configured the RRC connection and the DRB by the first RAN of the first RAT by receiving a second RRC message (e.g., RRCConnectionReconfiguration) on the RRC connection from the first RAN. The second RRC message includes a DRB configuration configuring the DRB. The UE configures or setups the DRB according to the DRB configuration. The DRB configuration may include at least one of a DRB identity, a Packet Data Convergence Protocol (PDCP) configuration and a Radio Link Control (RLC) configuration. Similarly, the UE AS context may include the DRB configuration. The UE AS context may include RRC configuration (s) in addition to the DRB configuration. The RRC configuration(s) may include at least one of a measurement configuration, a physical layer configuration and Medium Access Control (MAC) configuration. The UE AS context may include a security context.

In one example, the UE attaches to a core network (CN) via the first RAN according to the first RAT. Then, the UE establishes an evolved packet system (EPS) bearer context with the CN, wherein the DRB is associated with the EPS bearer context. Further, the UE may establish the EPS bearer context by transmitting a PDN Connectivity Request or a Bearer Resource Allocation Request message to the CN via the first RAN. The CN may transmit an ACTIVATE DEFAULT EPS BEARER CONTEXT REQUEST message in response to the PDN Connectivity Request message via the first RAN. In one example, the CN transmits an ACTIVATE DEDICATED EPS BEARER CONTEXT REQUEST message via the first RAN to the UE to establish the EPS bearer context in response to the Bearer Resource Allocation Request message.

The first RAT is different from the second RAT. The first RAT may be one of Narrow Band Internet of Things (NB-IoT), LTE and 5G. The second RAT may be one of Global System for Mobile Communications (GSM), Universal Mobile Telecommunications System (UMTS), NB-IoT, LTE and 5G.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a device and a method for handling a UE AS context. After a RRC connection of a first RAN is suspended, whether the UE AS context should be kept is determined according whether a cell of a second RAN is selected. Thus, a rule for handling validity of the UE AS context is provided, and the UE is able to operate regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a user equipment (UE) Access Stratum (AS) context, comprising:
   a storage device, for storing instructions of:
      being configured a radio resource control (RRC) connection and a data radio bearer (DRB) by a first radio access network (RAN) of a first radio access technology (RAT);
      receiving a first RRC message via the RRC connection from the first RAN, wherein the first RRC message comprises a resume identity and indicates a RRC suspension;
      suspending the RRC connection in response to the first RRC message;
      keeping a UE AS context, when the RRC connection is suspended;
      selecting a cell of a second RAN of a second RAT different from the first RAT;
      determining that the UE AS context and the resume identity are invalid in response to the selection; and
      transmitting a RRC connection request message to the first RAN, when the UE selects back a cell of the first RAN from the second RAN in response to the determination; and
   a processing circuit, coupled to the storage device, configured to execute the instructions stored in the storage device.

2. The communication device of claim 1, wherein the storage device further stores the instructions of:
   receiving a RRC connection setup message in response to the RRC connection request message; and
   entering a connected mode of the first RAT.

3. The communication device of claim 1, wherein the storage device further stores the instruction of:
   transmitting a resume request message triggered by an initiation of a service request procedure or an extended service request procedure to the first RAN, before selecting the second RAN.

4. The communication device of claim 1, wherein the communication device selects the cell of the second RAN according to the second RAT, when the cell of the second RAN meets a cell selection or reselection criteria.

5. The communication device of claim 1, wherein the storage device further stores the instruction of:
   initiating a connection establishment to connect to the second RAN by transmitting a connection request message of the second RAT to the second RAN; and
   receiving a connection setup message in response to the connection request message from the second RAN, to enter a connected mode of the second RAT.

6. The communication device of claim 1, wherein the storage device further stores the instructions of:
   determining that the UE AS context is not valid, when the communication device connects to the second RAN; and
   determining the UE AS context is valid, when the communication device selects the second RAN but does not connect to the second RAN.

7. The communication device of claim 1, wherein the instruction of being configured the RRC connection and the DRB by the first RAN of the first RAT comprises:
   receiving a second RRC message comprising a DRB configuration configuring the DRB on the RRC connection from the first RAN;
   wherein the UE AS context comprises the DRB configuration, and the DRB configuration comprises at least one of a DRB identity, a Packet Data Convergence Protocol (PDCP) configuration and a Radio Link Control (RLC) configuration.

8. The communication device of claim 1, wherein the storage device further stores the instructions of:
   attaching to a core network (CN) via the first RAN according to the first RAT; and
   establishing an EPS bearer context with the CN by transmitting a PDN Connectivity Request or a Bearer Resource Allocation Request message to the CN, wherein the DRB is associated with the EPS bearer context.

9. A method for handling a user equipment (UE) Access Stratum (AS) context of a communication device, comprising:

being configured a radio resource control (RRC) connection and a data radio bearer (DRB) by a first radio access network (RAN) of a first radio access technology (RAT);
receiving a first RRC message via the RRC connection from the first RAN, wherein the first RRC message comprises a resume identity and indicates a RRC suspension;
suspending the RRC connection in response to the first RRC message;
keeping a UE AS context, when the RRC connection is suspended;
selecting a cell of a second RAN of a second RAT different from the first RAT;
determining that the UE AS context and the resume identity are invalid in response to the selection; and
transmitting a RRC connection request message to the first RAN, when the UE selects back a cell of the first RAN from the second RAN in response to the determination.

10. The method of claim 9, further comprising:
receiving a RRC connection setup message in response to the RRC connection request message; and
entering a connected mode of the first RAT.

11. The method of claim 9, further comprising:
transmitting a resume request message triggered by an initiation of a service request procedure or an extended service request procedure to the first RAN, before selecting the second RAN.

12. The method of claim 9, wherein the communication device selects the cell of the second RAN according to the second RAT, when the cell of the second RAN meets a cell selection or reselection criteria.

13. The method of claim 9, further comprising:
initiating a connection establishment to connect to the second RAN by transmitting a connection request message of the second RAT to the second RAN; and
receiving a connection setup message in response to the connection request message from the second RAN, to enter a connected mode of the second RAT.

14. The method of claim 9, further comprising:
determining that the UE AS context is not valid, when the communication device connects to the second RAN; and
determining the UE AS context is valid, when the communication device selects the second RAN but does not connect to the second RAN.

15. The method of claim 9, wherein the step of being configured the RRC connection and the DRB by the first RAN of the first RAT comprises:
receiving a second RRC message comprising a DRB configuration configuring the DRB on the RRC connection from the first RAN;
wherein the UE AS context comprises the DRB configuration, and the DRB configuration comprises at least one of a DRB identity, a Packet Data Convergence Protocol (PDCP) configuration and a Radio Link Control (RLC) configuration.

16. The method of claim 9, further comprising:
attaching to a core network (CN) via the first RAN according to the first RAT; and
establishing an EPS bearer context with the CN by transmitting a PDN Connectivity Request or a Bearer Resource Allocation Request message to the CN, wherein the DRB is associated with the EPS bearer context.

* * * * *